(12) United States Patent
Harris, Jr. et al.

(10) Patent No.: US 7,962,780 B2
(45) Date of Patent: Jun. 14, 2011

(54) COMMAND SEQUENCE NUMBERING APPARATUS AND METHOD

(75) Inventors: Theodore Timothy Harris, Jr., Tucson, AZ (US); Matthew Joseph Kalos, Tucson, AZ (US); Steven Edward Klein, Tucson, AZ (US); Gail Andrea Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 12/197,183

(22) Filed: Aug. 22, 2008

(65) Prior Publication Data

US 2010/0049928 A1 Feb. 25, 2010

(51) Int. Cl.
*G06F 11/00* (2006.01)
(52) U.S. Cl. ............ 714/6; 714/5; 714/21; 714/50
(58) Field of Classification Search .............. 714/5, 6, 714/20, 21, 50
See application file for complete search history.

(56) References Cited

U.S. PATENT DOCUMENTS

| | | | | |
|---|---|---|---|---|
| 5,126,889 A * | 6/1992 | Walden | ............................ | 360/53 |
| 5,261,092 A * | 11/1993 | McLaughlin et al. | ........ | 713/375 |
| 5,504,861 A * | 4/1996 | Crockett et al. | ................ | 714/13 |
| 5,740,397 A * | 4/1998 | Levy | ............................ | 711/114 |
| 5,875,479 A * | 2/1999 | Blount et al. | ................. | 711/162 |
| 6,480,970 B1 * | 11/2002 | DeKoning et al. | ............... | 714/6 |
| 6,594,786 B1 * | 7/2003 | Connelly et al. | ................ | 714/50 |
| 6,671,777 B1 * | 12/2003 | Krehbiel et al. | ............. | 711/114 |
| 6,895,416 B2 | 5/2005 | Gara et al. | | |
| 6,938,084 B2 | 8/2005 | Gamache et al. | | |
| 7,139,781 B2 | 11/2006 | Young et al. | | |
| 7,149,919 B2 * | 12/2006 | Cochran et al. | ................... | 714/4 |
| 7,234,033 B2 * | 6/2007 | Watanabe | ..................... | 711/162 |
| 7,581,136 B2 * | 8/2009 | Osaki | .............................. | 714/20 |
| 7,600,087 B2 * | 10/2009 | Yamagami | .................... | 711/162 |
| 7,725,579 B2 * | 5/2010 | Cook et al. | .................... | 709/224 |
| 7,779,291 B2 * | 8/2010 | Yoder et al. | ....................... | 714/5 |
| 7,783,848 B2 * | 8/2010 | Yamagami | .................... | 711/161 |

(Continued)

OTHER PUBLICATIONS

Muller, René, Gustavo Alonso, Donald Kossmann, A Virtual Machine For Sensor Networks, ACM SIGOPS Operating Systems Review, vol. 41, Issue 3, Jun. 2007, pp. 145-158, ISSN:0163-5980.

(Continued)

*Primary Examiner* — Robert Beausoliel
*Assistant Examiner* — Joshua P Lottich
(74) *Attorney, Agent, or Firm* — Nelson and Nelson; Daniel P. Nelson; Alexis V. Nelson

(57) ABSTRACT

A method, system, and computer program product to preserve data integrity in a mirror and copy environment is disclosed herein. In one embodiment, a method may include receiving a write command and data from a host device. The method may further include writing the data to a primary storage device and attaching a primary sequence number associated with the primary storage device to the write command, thereby providing a numbered write command with a command sequence number. The numbered write command may then be transmitted to a secondary storage device. The method may further include comparing the command sequence number to a secondary sequence number associated with the secondary storage device. If the command sequence number matches the secondary sequence number, then the command may be executed. Otherwise, it may be ignored.

20 Claims, 8 Drawing Sheets

U.S. PATENT DOCUMENTS

| | | | |
|---|---|---|---|
| 7,783,922 B2* | 8/2010 | Kawamura | 714/20 |
| 2005/0132248 A1* | 6/2005 | Lecrone et al. | 714/5 |
| 2006/0005074 A1* | 1/2006 | Yanai et al. | 714/5 |
| 2007/0073985 A1* | 3/2007 | Wilkes | 711/161 |
| 2007/0186066 A1* | 8/2007 | Desai et al. | 711/162 |
| 2007/0186127 A1* | 8/2007 | Desai et al. | 714/13 |

OTHER PUBLICATIONS

Burrows, Mike, The Chubby Lock Service for Loosely-Coupled Distributed Systems, OSDI'06: Seventh Symposium on Operating System Design and Implementation, Seattle, WA, Nov. 2006, pp. 335-350 of the Proceedings.

* cited by examiner

COMMAND SEQUENCE NUMBERING APPARATUS AND METHOD

BACKGROUND

1. Field of the Invention

This invention relates to data storage management, and more particularly to apparatus and methods for maintaining data integrity.

2. Background of the Invention

Data is increasingly one of an organization's most valuable assets. Accordingly, it is paramount that an organization protect its data. One method for protecting data is to store multiple copies of the data so that if one copy is corrupted, a valid copy will still remain. In a mirror and copy (e.g., PPRC, Metro Mirror, Global Mirror, etc.) environment, two storage devices may be located some distance from one another to store two or more copies of the same data.

Typical mirror and copy systems, for example, may include a host device, a primary storage device and a secondary storage device. The host device may write data to the primary storage device, which in turn may copy the data to the secondary storage device. The I/O is only considered complete when the write to both the primary and secondary storage devices is complete.

In some mirror and copy systems, a delay of arbitrary duration may occur when messages (e.g., write commands) are transmitted from the primary storage device to the secondary storage device. That is, a period may exist between the time the primary storage device transmits a write command to the secondary storage device, and the time the data associated with the write command is actually written to the secondary storage device. These delays may be the result of network delays, queuing on storage device network adapters, or where the secondary storage device is temporarily unable to process a command because it is handling a fault or error. Situations may also occur in which messages sent by the primary storage device are lost and do not arrive at the secondary storage device. Such situations may compromise data integrity because they may create situations where data is lost or newer data is undesirably overwritten with older (stale) data.

In some mirror and copy systems, multiple communication paths may exist between a primary and secondary storage device. A write command that was unsuccessfully transmitted over one path may be re-transmitted over another path. For various reasons (e.g., network delays, hardware problems, etc.), data may travel more quickly down one path than another. As a result, commands sent from the primary storage device to the secondary storage device over different paths may not arrive in the order in which they were sent. In addition, some implementations could require multiple concurrent updates to the same areas of a secondary volume.

In the event that a write command needs to be re-driven, the first write command is typically aborted prior to sending the second write command. There may exist, however, a period of time in which the first write command cannot be reliably aborted. Even if the primary storage device aborts the first write command, the secondary storage device may receive and process the first write command prior to receiving the abort command. There is a possible situation where a second write command could arrive and be processed at the secondary storage device before the first write command is processed. This may create a situation wherein the first write command overwrites newer data and compromises data integrity.

Current methods do not provide a way to reliably solve the above-mentioned problems without incurring a possible significant performance penalty. For example, the primary storage device may read back data from the secondary storage device to determine what was actually written, or perform lengthy operations to flush commands prior to sending new commands. Some protocol standards may require the network to deliver or discard traffic within a certain period of time. Thus, in order to guarantee that subsequent commands do not arrive before the original command, which could compromise data integrity, primary storage device recovery may also include waiting long timeout periods before accessing the same secondary device. However, a significant drawback of these and other methods is that they do not perform operations quickly enough to meet stringent performance requirements.

In view of the foregoing, what is needed is an apparatus and method to preserve data integrity between primary and secondary storage devices in a mirror and copy environment. Ideally, such an apparatus and method would ensure that data associated with commands sent by the primary storage device to the secondary storage device and later aborted will not overwrite newer data on the secondary storage device. Further needed are apparatus and methods to ensure that commands that do not complete quickly can be reliably aborted and re-driven down another path to meet system performance requirements.

BRIEF SUMMARY

The invention has been developed in response to the present state of the art and, in particular, in response to the problems and needs in the art that have not yet been fully solved by currently available apparatus and methods. Accordingly, the invention has been developed to provide improved apparatus and methods for preserving data integrity in a mirror and copy environment. The features and advantages of the invention will become more fully apparent from the following description and appended claims, or may be learned by practice of the invention as set forth hereinafter.

Consistent with the foregoing, a method to preserve data integrity in a mirror and copy environment is disclosed herein. According to one embodiment of the invention, such a method may include receiving a write command and data from a host device. The method may also include writing the data to a primary storage device and attaching a primary sequence number associated with the primary storage device to the write command, thereby providing a numbered write command with a command sequence number. This numbered write command may then be transmitted to a secondary storage device. The command sequence number may then be compared to a secondary sequence number associated with the secondary storage device. If the command sequence number matches the secondary sequence number, the command will be executed. Otherwise, it will be ignored.

In another embodiment of the invention, a system to preserve data integrity in a mirror and copy environment may include a primary storage device to receive a write command and associated data from a host device, and then execute the write command. The primary storage device may also be configured to attach a primary sequence number associated with the primary storage device to the write command, thereby providing a numbered write command having a command sequence number. The primary storage device may also be configured to transmit the numbered write command to a secondary storage device. The secondary storage device may compare the command sequence number to a secondary sequence number associated with the secondary storage device. The secondary storage device may execute the numbered write command in the event the command sequence number matches the secondary sequence number, and ignore the numbered write command in the event the command sequence number does not match the secondary sequence number.

In yet another embodiment of the invention, a computer program product is disclosed for preserving data integrity between primary and secondary storage devices in a mirror and copy environment. The computer program product may include a computer-readable medium having computer-readable program code embodied therein. In one embodiment, the computer-readable program code may include code to receive a write command and data from a host device. The computer-readable program code may also include code to write data to the primary storage device and code to attach a primary sequence number to the write command, thereby providing a numbered write command with a command sequence number. The computer-readable program code may also include code to transmit the numbered write command to the secondary storage device. The computer-readable program code may also include code to compare the command sequence number sent with the write command to a secondary sequence number associated with the secondary storage device. The computer-readable program code may also include code to execute the numbered write command in the event the command sequence number matches the secondary sequence number, and ignore the numbered write command in the event the command sequence number does not match the secondary sequence number.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
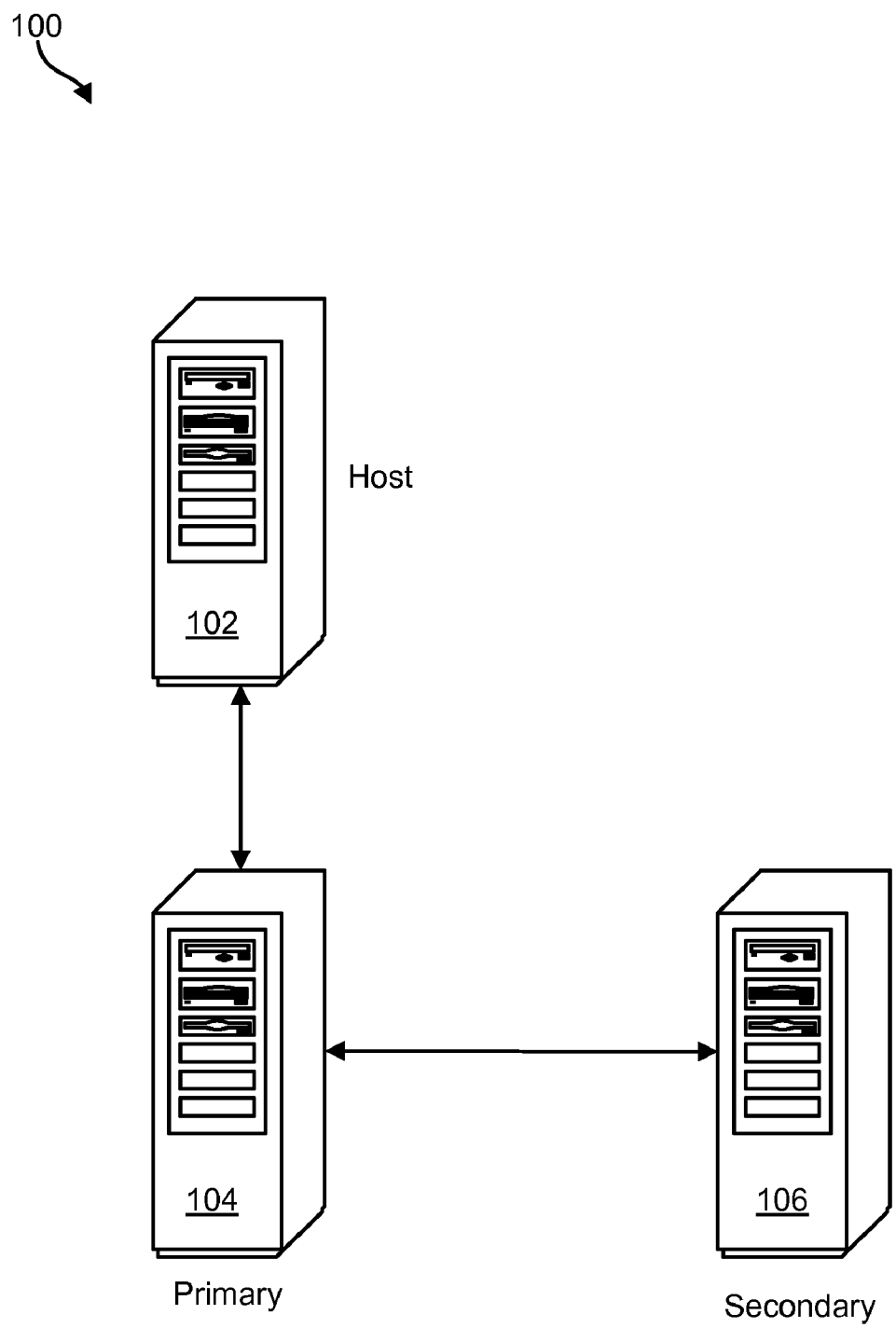
FIG. 1 is a high-level diagram of one embodiment of a system in accordance with the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, method, or computer program product. Accordingly, the present invention may take the form of a hardware embodiment, a software embodiment (including firmware, resident software, microcode, etc.) configured to operate hardware, or an embodiment combining both software and hardware aspects that may all generally be referred to herein as a "module" or "system." Furthermore, the present invention may take the form of a computer-readable storage medium embodied in any tangible medium of expression having computer-readable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, or semiconductor system, apparatus, or device. More specific examples (a non-exhaustive list) of the computer-readable storage medium may include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

In the context of this document, a computer-usable or computer-readable storage medium may be any storage medium that can contain, store, or transport the program for use by or in connection with the instruction execution system, apparatus, or device.

Computer program code for carrying out operations of the present invention may be written in any combination of one or more programming languages, including but not limited to object-oriented programming languages such as Java, Smalltalk, C++ or the like, conventional procedural programming languages, such as the "C" programming language, low level programming languages such as assembly language, functional programming languages such as LISP or Haskell, or any other computer programming language deemed suitable for embodying the invention. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, in selected embodiments, an apparatus 100 or system 100 for storing a redundant copy of data to preserve data integrity may include a host device 102, a primary storage device 104, and a secondary storage device 106. The host device 102 may be configured to write data to the primary storage device 104. The primary storage device 104 may be configured to transmit a duplicate copy of the data to the secondary storage device 106 for storage thereon. It may also be configured to ensure that the data has been correctly written to the secondary storage device 106.

The secondary storage device 106 may be configured to receive write commands from the primary storage device 104, perform validation on the data, and return a confirmation to the primary storage device 104 that the data was successfully written. The primary storage device 104 may be also configured to wait for a confirmation from the secondary storage device 106 indicating that the data was successfully written. Upon receiving this confirmation, the primary storage device 104 may transmit a confirmation to the host device 102 indicating that the data was successfully written to both the primary storage device 104 and secondary storage device 106.

Figure 2:
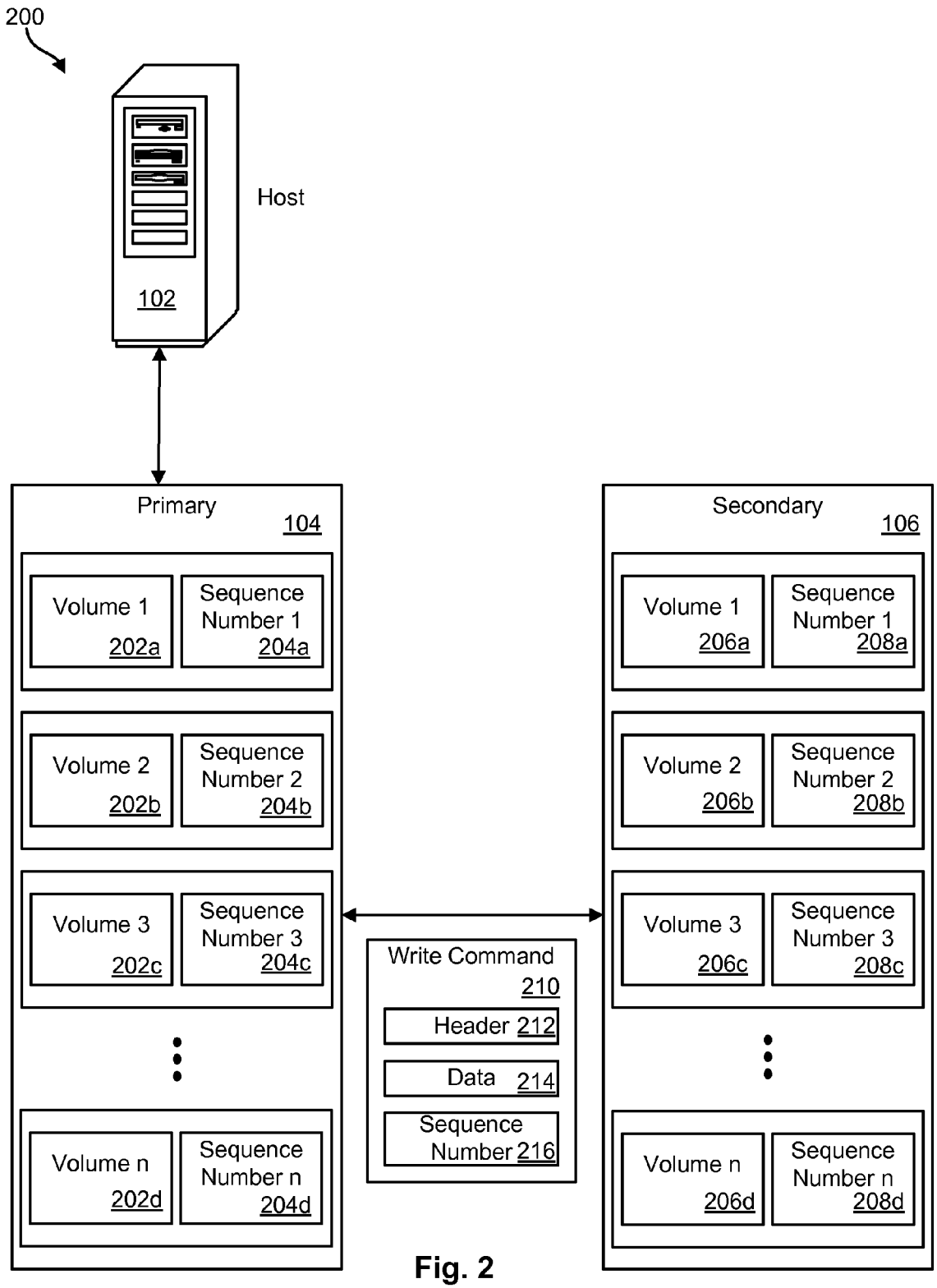
FIG. 2 is a more detailed diagram of the system depicted in FIG. 1.

Referring to FIG. 2, in selected embodiments, the primary storage device 104 and secondary storage device 106 may be configured to store one or more volumes of data 202, 206. These volumes 202, 206 may be arranged in pairs. That is, the primary storage device 104 and secondary storage device 106 may be configured to store duplicate copies of data such that the volume 206a stores a copy of the data in the volume 202a, the volume 206b stores a copy of the data in the volume 202b, and so forth. Each volume 202, 206 of data may have associated therewith one or more sequence numbers 204, 208 to help preserve the integrity of the data stored therein.

When the primary storage device 104 receives a write command from the host device 102, the primary storage device 104 may write the data associated with the write command to the appropriate volume 202. The primary storage device 104 may then attach a volume sequence number 204 to the write command to generate a numbered write command 210, and transmit the numbered write command 210 to the secondary storage device 106. In selected embodiments, the numbered write command 210 may include a write command header 212, associated data 214, and a command sequence number 216 matching the sequence number 204 of the primary volume 202 where the data was written. In selected embodiments, the write command header 212 and command sequence number 216 may be sent as a single frame, and followed by one or more data frames 214. Upon receiving the numbered write command, the secondary storage device 106 may compare the secondary sequence number 208 to the command sequence number 216. If the numbers match, the secondary storage device 106 may write the data 214 associated with the write command 210 to the appropriate secondary volume(s) 206. If the numbers do not match, the secondary storage device 106 may ignore or reject the write command 210.

For the purposes of this description, the term "matching" means that two numbers (e.g., the command sequence number 216 and the secondary sequence number 208) correspond to each other in some fashion. An algorithm for determining whether or not two numbers match may include but is not limited to comparing some or all parts of the number, and may also include performing any number of operations on each of the operands before the comparison is made. Operations performed during matching may include but are not limited to adding, subtracting, shifting the bits of one or more of the operands, applying a bitmask to one or both of the operands, or any other operations seemed appropriate to establish a correspondence between the two operands. In selected embodiments, matching does not necessarily represent a one to one correspondence (i.e., an exact match) of two numbers. A match may simply mean that some function of the two operands returns true. In certain embodiments, the matching algorithm may check for equality or may simply check if one operand is in some respect numerically less than or greater than the other.

In selected embodiments, when the secondary storage device 106 receives a write command 210 and the secondary sequence number 208 does not match the command sequence number 216, an error message will be generated and sent to the primary storage device 104. In certain embodiments, the error message may contain the command sequence number 216 received, the current secondary sequence number 208, or any information deemed useful for processing the error on the primary storage device 104. As will be shown in more detail hereafter, the sequence numbers 204, 208, 216 may be used to preserve the data integrity of the system because write commands can be reliably cancelled by simply updating the primary sequence number 204 and secondary sequence number 208.

As mentioned previously, various situations may occur in which new data may be overwritten by old data. This problem may be addressed by sending a sequence number 216 with every write command 201. If a write command does not complete within a specified period, it may by aborted and the sequence number 208 on the secondary storage device 106 may be updated. The command 210 may then be re-driven down another path between the primary and secondary storage devices 104, 106. If the command 210 that was aborted arrives at the secondary storage device 106, the command 210 will not be processed because its sequence number 216 will not match the updated secondary sequence number 208.

As will be explained in more detail in association with FIGS. 3 and 4, updating the sequence number may include updating both the primary sequence number 204 and the secondary sequence number 208. In selected embodiments, after the primary sequence number 204 is updated, the primary storage device 104 will wait a specified period of time before updating the secondary sequence number 204. This wait time may allow current operations to arrive at the secondary storage device 106 and complete prior to updating the secondary sequence number 208. In certain embodiments, this wait time may be reduced or eliminated if there are few or no currently pending operations.

Figure 3:
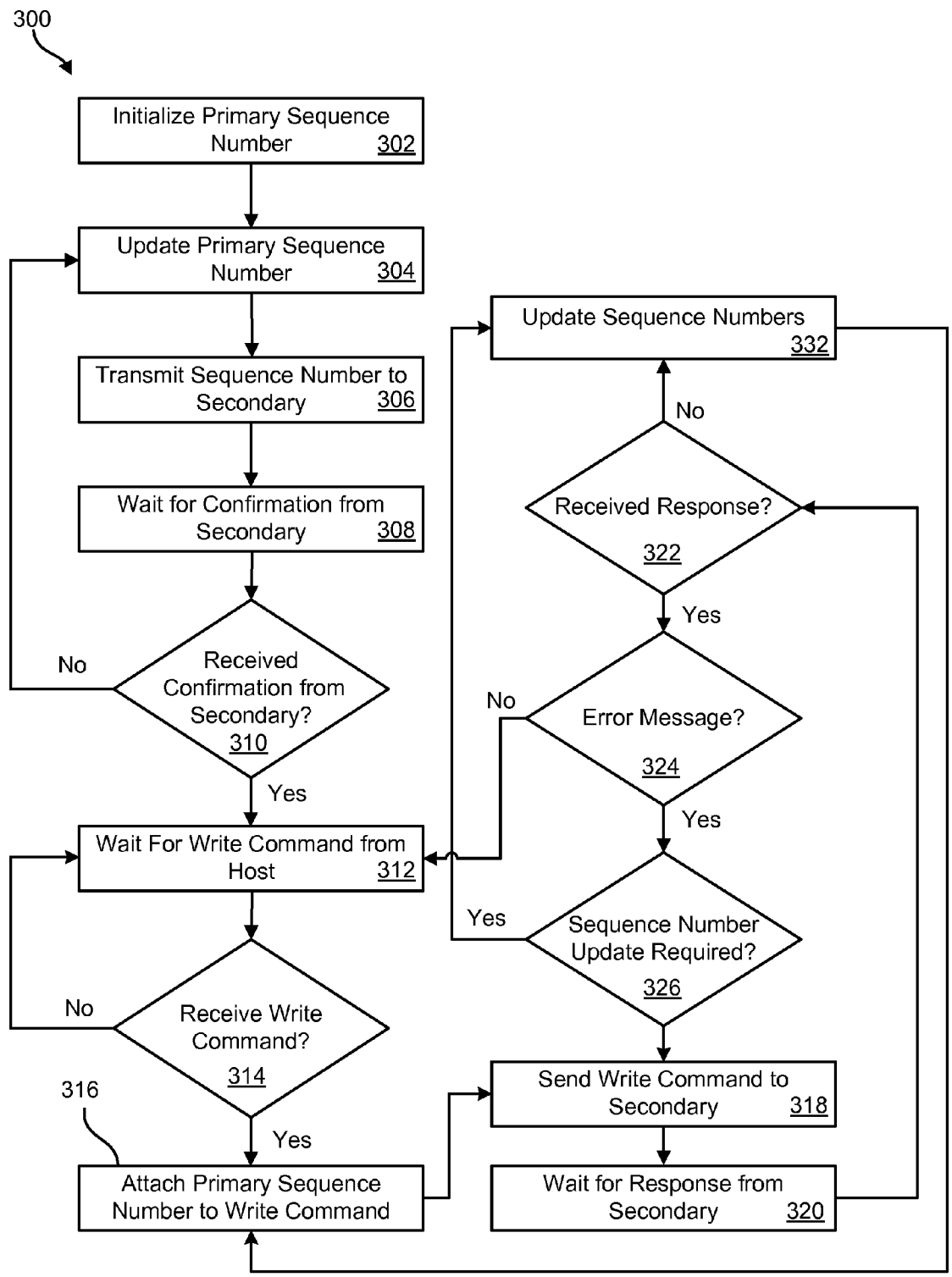
FIG. 3 is a flow chart of one embodiment of a method which may be implemented by the primary storage device illustrated in FIG. 1.

Referring to FIG. 3, in selected embodiments, a method 300 in accordance with the invention for implementation on the primary storage device 104 may include initializing 302 the primary sequence number 204. For example, the primary sequence number 204 may be initialized 302 to zero or any other value deemed suitable for the initial representation of the primary sequence number 204. The method 300 may then update 304 the primary sequence number 204. In certain embodiments, updating 304 the primary sequence number 204 may include incrementing, decrementing, or otherwise modifying the primary sequence number 204.

After the primary sequence number 204 has been updated, the method 300 may transmit 306 the primary sequence number 204 to the secondary storage device 106. The primary storage device 104 may then wait 308 for a confirmation from the secondary storage device 106 that the secondary sequence number 208 has been updated. In selected embodiments, if, at a test 310, there is no response from the secondary storage device 106 within a specified time period, the method 300 may update 304 the primary sequence number 204 and repeat the steps 306, 308, 310 until a confirmation is received from the secondary storage device 106, thereby allowing the method 300 to continue.

After the secondary sequence number 208 has been updated, the primary storage device 104 may wait 312 for a write command from the host 102. In selected embodiments, the method 300 may loop until it receives a write command 210 from the host device 102. In other embodiments, the method 300 may use other means to determine when a write command has been received from the host device 102, including but not limited to waiting for an interrupt or using a callback mechanism.

If, at a test 314, a write command 210 is received, the method 300 may attach 316 the primary sequence number 204 to the write command 210 and send 318 the write command 210 to the secondary storage device 106. The method 300 may then wait 320 for a response from the secondary storage device 106. Waiting 320 may include but is not limited to repeatedly checking 322 for a response and looping until a response arrives. When a response is received 322, the method 300 may determine 324 whether or not an error message was received. If the method 300 determines 324 that an error message was received, the method 300 may determine 326 whether or not the error message requires updating the sequence numbers 204, 208. If the method 300 determines 326 that the sequence numbers 204, 208 need to be updated, the method 300 may update 332 (which may include performing substantially the same logic as steps 304, 306, 308, 310) the sequence numbers 204,208. If the method 300 determines 326 that the sequence numbers 204,208 do not need to be updated, the method 300 may resend 318 the write command to the secondary storage device 106. If the method 300 determines 324 that the response received was not an error message, then the method 300 may wait 312 for another write command 210 from the host device 102.

If the method 300 determines 322 that a response was not received within an appropriate time, the method 300 may check 324 whether or not the response was an error message. If a response has not been received 322, the method 300 may update 332 the primary sequence number, attach 316 the updated primary sequence number to the write command 210, and re-send 318 the write command 210 to the secondary storage device 106, possibly over another path.

Figure 4:
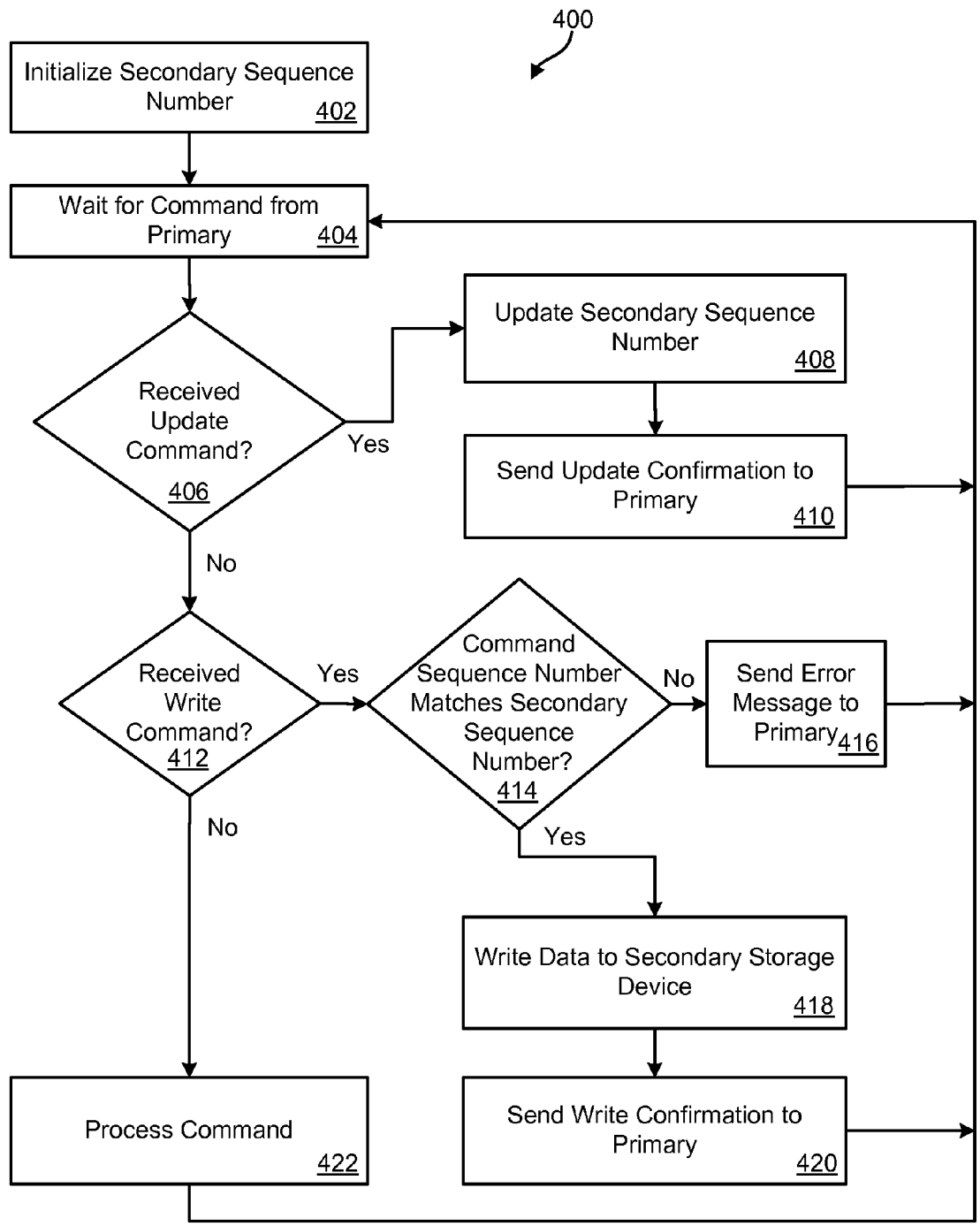
FIG. 4 is a flow chart of one embodiment of a method which may be implemented by the secondary storage device illustrated in FIG. 1.

Referring to FIG. 4, in selected embodiments a method 400 for implementation on the secondary storage device 106 may include initializing 402 the secondary sequence number 208 to zero or any other value deemed suitable for the initial value of the secondary sequence number 208. The secondary storage device 106 may be controlled by the primary storage device 104. Accordingly, the method 400 may wait 404 for a command from the primary storage device. When a command is received, the method 400 may proceed by updating 408 the appropriate secondary sequence number 208.

After updating 408 the secondary sequence number 208, the secondary storage device 106 may send 410 an update confirmation to the primary storage device 104, indicating that the secondary sequence number 208 has been updated 408. If the method 400 determines 406 that the command received is not an update command, the method 400 may determine 412 whether the command received was a write command 210. If the command received was a write command 210, the method 400 may check 414 whether the command sequence number 216 matches the secondary sequence number 208. If the command sequence number 216 does not match 414 the secondary sequence number 208, an error message may be sent 416 to the primary storage device 104, and the method 400 may wait 404 for the next command from the primary storage device 104. In selected embodiments, the error message may contain the command sequence number 216, the secondary sequence number 208, and any other information deemed necessary, such as information pertaining to the state or address of the secondary storage device 106.

If the command sequence number 216 matches 414 the secondary sequence number 208, then the data associated with the write command 210 may be written 418 to the secondary storage device 106. A write confirmation may then be sent 420 to the primary storage device 104. The method 400 may then wait 404 for the next command from the primary storage device 104. In the event the command received is not an update command or a write command, the method 400 may process 422 any other command that is received and wait 404 for the next command from the primary storage device 104.

Figure 5:
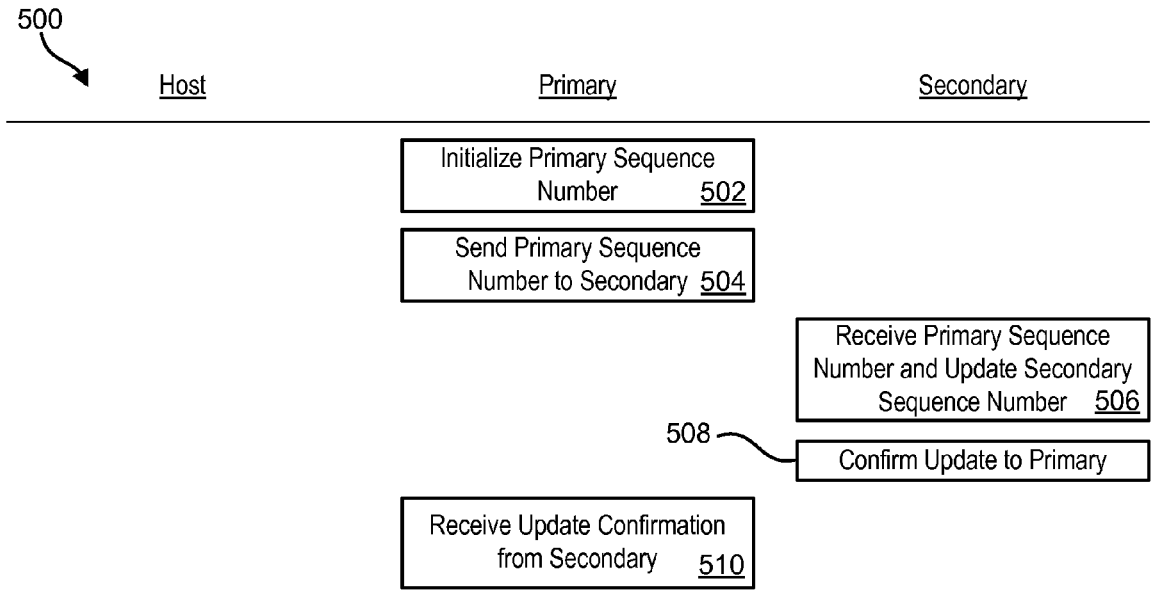
FIG. 5 is a sequence diagram showing one scenario wherein the sequence number is updated.

Referring to FIG. 5, in selected embodiments in accordance with the invention, a sequence diagram 500 may be used to depict the interactions between the host device 102, the primary storage device 104, and the secondary storage device 106. In one embodiment, the primary storage device 104 may begin by initializing 502 the primary sequence number 204. The primary sequence number 204 may then be sent 504 to the secondary storage device 106 using the update command previously discussed. The secondary storage device 106 may then receive 506 the primary sequence number 204 and update 506 the secondary sequence number 208 so that it matches the primary sequence number 204. In selected embodiments, the secondary storage device 106 may confirm 508 the update to the primary storage device 104. Confirming 508 the update may include but is not limited to sending a confirmation that the sequence number was updated, as well as any additional information that may be deemed useful. The primary storage device 104 may then receive 510 the update confirmation from the secondary storage device 106.

Figure 6:
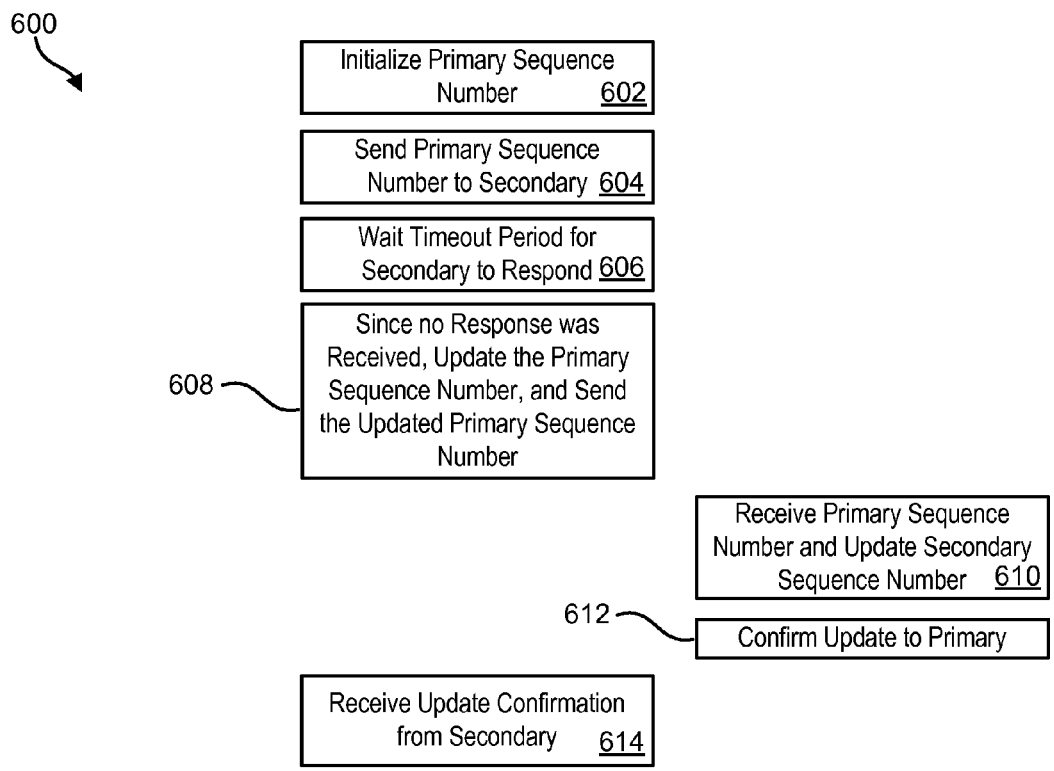
FIG. 6 is a sequence diagram showing another scenario wherein the sequence number is updated.

Referring to FIG. 6, in another scenario, the primary storage device 106 may begin by initializing 602 the primary sequence number 204. The primary sequence number 204 may then be sent 604 to the secondary storage device 106 using an update command. In certain cases, the update command may not arrive in a reasonable time (due to network delays, hardware problems, error conditions, or the like), or may be lost. In such a scenario, the primary storage device 104 may wait 606 a timeout period and then update the primary sequence number 204. The updated primary sequence number 204 may then be sent 608 to the secondary storage device 106. The secondary storage device 106 may then receive 610 the primary sequence number 204 and update 610 the secondary sequence number 208 accordingly. Like the previous example, the secondary storage device 106 may then confirm 612 the update to the primary storage device 104. The primary storage device 104 may then receive 614 the update confirmation from the secondary storage device 106.

Figure 7:
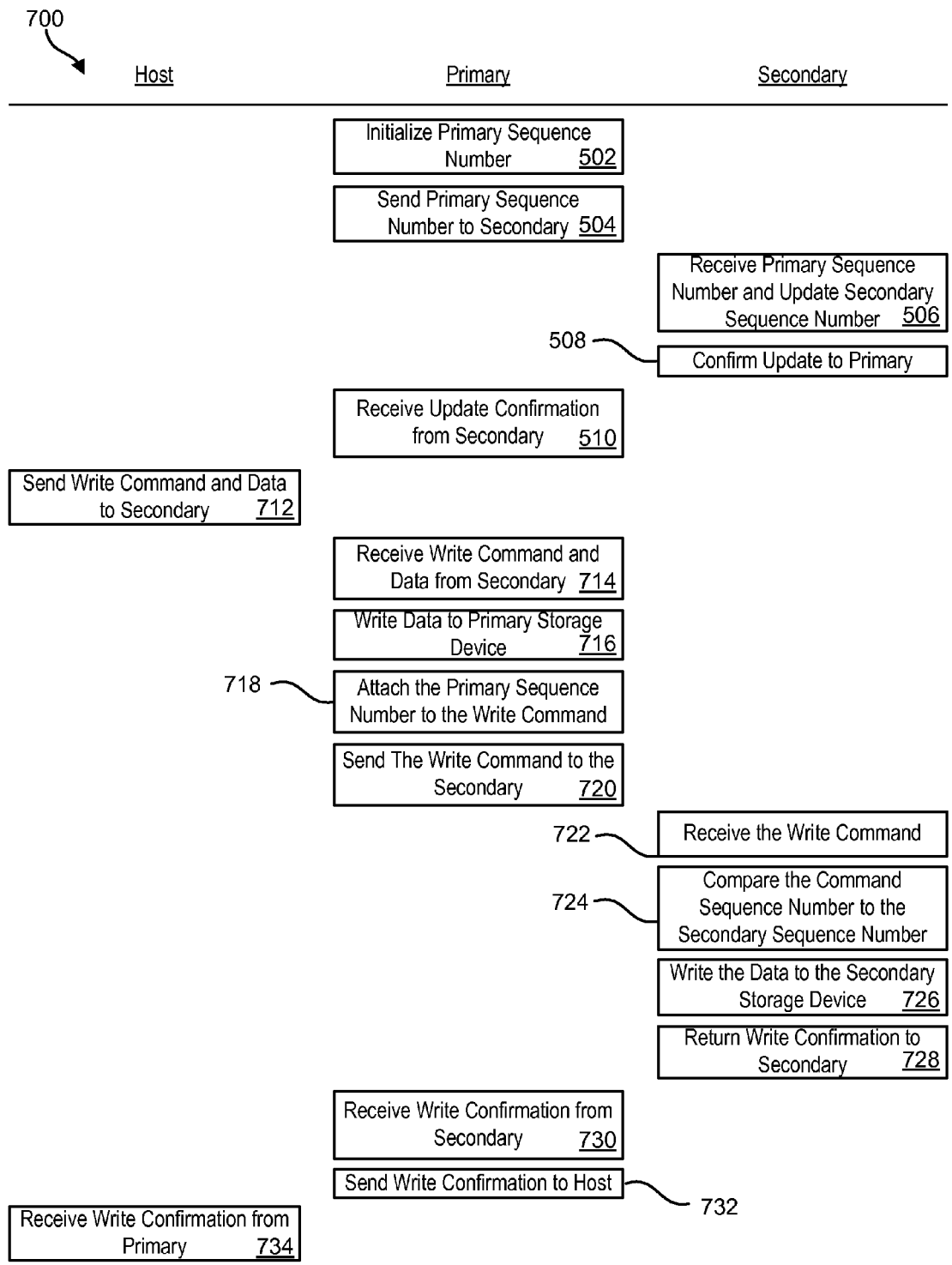
FIG. 7 is a sequence diagram depicting a scenario wherein the host device writes data to the primary storage device.

Referring to FIG. 7, in another scenario, the initialization steps 502, 504, 506, 508, 510 discussed in association with FIG. 5 may be initially performed. The host device 102 may then send 712 a write command 210 and associated data to the primary storage device 104. In certain embodiments, the command and data may be sent 712 separately, together as a single packet, or sent as multiple packets. The primary storage device 104 may then receive 714 the write command and data sent 712 by the host device 102. In selected embodiments, receiving 714 the data may include but is not limited to handshaking, performing redundancy checks, or otherwise verifying the data to ensure that it was properly received. After the data has been received 714, the data may be written 716 to the appropriate primary volumes 202. The primary sequence number 204 may then be attached 718 to the write command. Attaching 718 the primary sequence number 204 may include appending the primary sequence number 204 to the write command, including the primary sequence number 204 in a header of the write command, restructuring the write command and/or associated data to contain the primary sequence number 204, or otherwise including 718 the primary sequence number 204 with the write command 210 or associated data 214.

The write command 210 may then be sent 720 to the secondary storage device 106. The secondary storage device 106 may receive 722 the write command 210 from the primary storage device 104. In selected embodiments, the data may be sent 720 with the write command, or the data may be sent as a separate frame or packet. In selected embodiments, receiving 722 the write command 210 may include handshaking to receive the data, performing redundancy checks or other data verification techniques to determine whether the command received from the primary storage device 104 is complete and correct. The secondary storage device 106 may then compare 724 the secondary sequence number 208 to the command sequence number 216. If the numbers match, the secondary storage device 106 may write 726 the associated data to the appropriate secondary volumes 206. A write confirmation may then be sent 728 to the primary storage device 104. In selected embodiments, the write confirmation may contain information about what was written, when the action was performed, or information helpful to verify data integrity. The primary storage device 104 may then receive 730 the write confirmation from the secondary storage device 106. The primary storage device 104 may then send 732 a write confirmation to the host device 102. The host device 102 may in turn receive 734 the write confirmation from the primary storage device 104.

Figure 8:
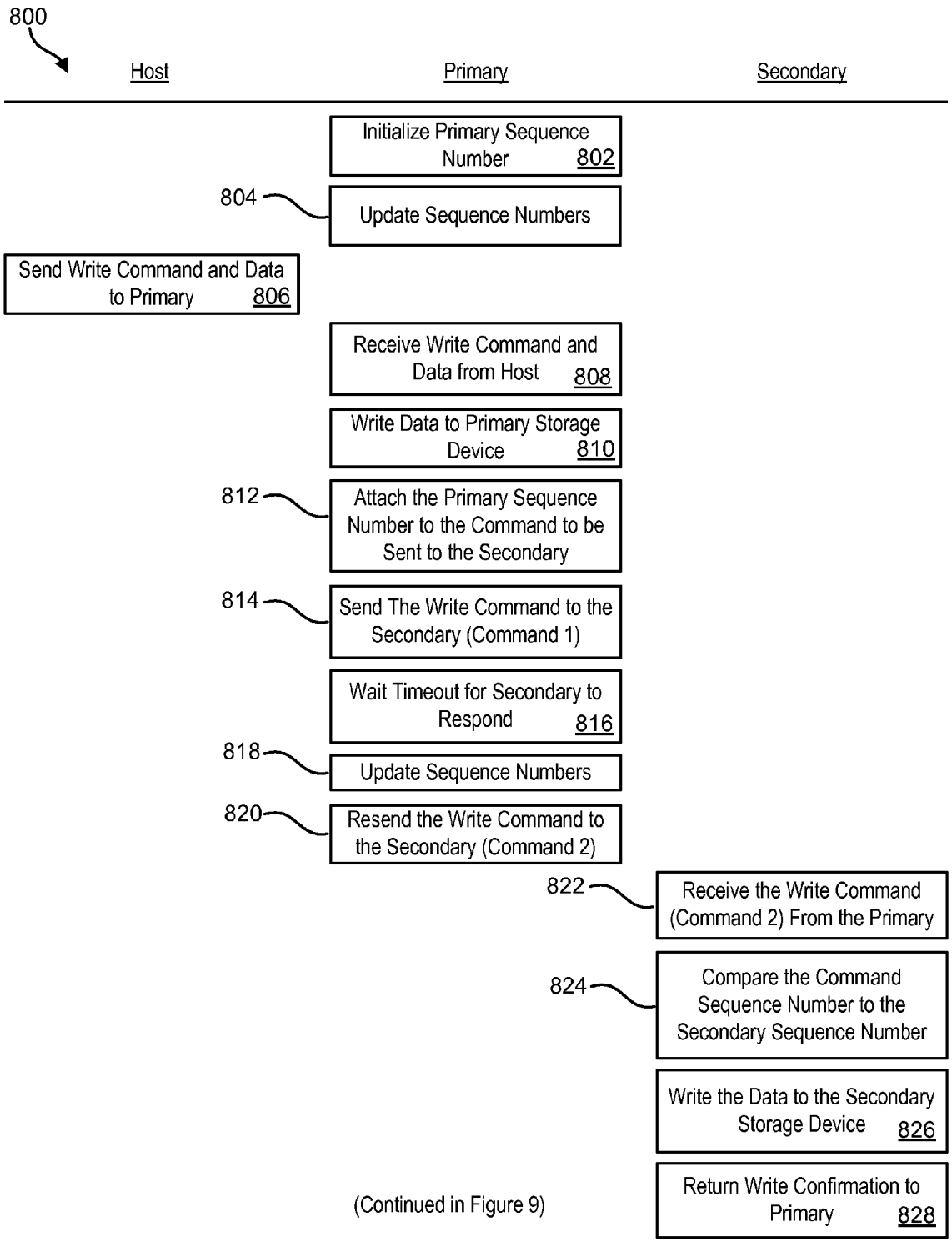
FIG. 8 is a sequence diagram showing another scenario wherein the host device writes data to the primary storage device.
Figure 9:
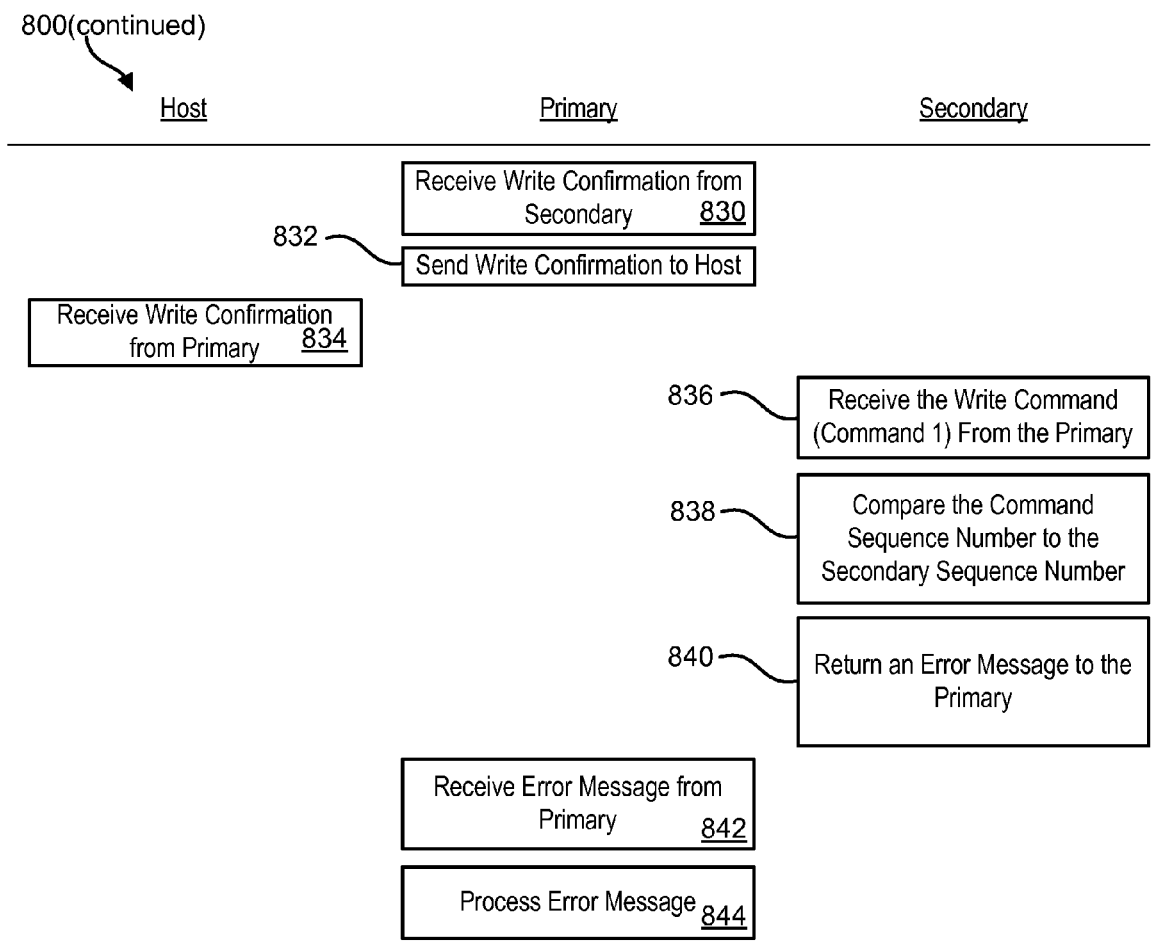
FIG. 9 is a continuation of the sequence diagram of FIG. 8.

Referring to FIGS. 8 and 9, in yet another scenario, the primary storage device 104 may begin by initializing 802 the primary sequence number 204. The primary sequence number 204 and secondary sequence number 208 may then be updated 804 (i.e., synchronized) as was described in association with FIGS. 5 and 6. The host device 102 may then send 806 a write command and associated data to the primary storage device 104. The primary storage device 104 may receive 808 the write command 210 from the host device 102 and write 810 the data to the appropriate primary volumes 202. The primary storage device 104 may then attach 812 the primary sequence number 204 to the write command 210. The primary storage device 104 may then send 814 the write command (command 1) to the secondary storage device 106.

As described previously, messages sent 814 from the primary storage device 104 to the secondary storage device 106 may not arrive in a timely manner or may be lost due to factors such as network delays, hardware problems, error conditions, or the like. In such a case, the primary storage device 104 may wait 816 a specified amount of time for the secondary storage device 106 to respond. When there is no response, the primary storage device 104 may update 818 the primary and secondary sequence numbers 204,208 as depicted in FIGS. 5 and 6. After the sequence numbers have been updated 818, the primary storage device 104 may resend 820 the same write command (command 2) 210 to the secondary storage device 106. "Command 1" designates the first attempt at sending the write command 210, while "command 2" designates the second attempt to send the same write command, except that command 2 has a different command sequence number. The secondary storage device 106 may then receive 822 the write command (command 2) 210 from the primary storage device 104.

The secondary storage device 104 may then compare 824 the secondary sequence number 208 to the command sequence number 216 (the primary sequence number 204 sent with command 2). Assuming the numbers match, the secondary storage device 106 will write the data to the appropriate secondary volumes 206. In selected embodiments, the secondary storage device 106 may then return 828 a write confirmation to the primary storage device 104 indicating that the data was written. The primary storage device 104 may receive 830 the write confirmation from the secondary storage device 106 and send 832 a confirmation to the host device 102 indicating that the data was successfully written. The host 102 may then receive 834 this confirmation.

In certain cases, the first write command (command 1) may arrive at the secondary storage device 106 after the second write command (command 2) has been written 826. This may be the result of network delays (if command 1 was transmitted over a slower path than command 2), hardware problems, or the like. This may undesirably cause command 1 to overwrite newer data with older data, potentially compromising data integrity.

The sequence numbering scheme described herein is intended to prevent this and other similar situations. Since the secondary sequence number 208 was updated 818 after the first write command (command 1) 210 was sent, the command sequence number 216 that is attached to command 1 is now outdated. As a result, upon comparing 838 the secondary sequence number to the command sequence number, the numbers will not match 838 and will generate an error. As a result, command 1 will not be processed. The error message may be returned 840 to the primary storage device 104 and the primary storage device 104 may receive 842 and process 844 the error message.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method to preserve data integrity between primary and secondary storage devices in a mirror and copy environment, the method comprising:
receiving a write command from a host device, the write command having data associated therewith;
writing the data to the primary storage device;
attaching, by the primary storage device, a primary sequence number associated with the primary storage device to the write command, thereby providing a numbered write command with a command sequence number;
transmitting, by the primary storage device, the numbered write command to a secondary storage device;
comparing, by the secondary storage device, the command sequence number to a secondary sequence number associated with the secondary storage device;
executing the numbered write command on the secondary storage device in the event the command sequence number matches the secondary sequence number; and
ignoring the numbered write command on the secondary storage device in the event the command sequence number does not match the secondary sequence number.

2. The method of claim 1, wherein ignoring further comprises transmitting an error message from the secondary storage device to the primary storage device.

3. The method of claim 2, further comprising invoking an error handling procedure on the primary storage device upon receiving the error message.

4. The method of claim 2, wherein transmitting the error message further comprises transmitting the command sequence number attached to the numbered write command and the secondary sequence number.

5. The method of claim 1, further comprising updating the primary sequence number in the event at least one of the following occurs: (a) applications are restarted; (b) services are restarted; (c) resources are transferred between at least two parts of the primary storage device; (d) a hardware failure occurs; (e) a software failure occurs; (d) a path is removed between the primary and secondary storage devices; and (e) a timeout occurs.

6. The method of claim 5, wherein updating the primary sequence number further comprises transmitting the updated primary sequence number to the secondary storage device and updating the secondary sequence number to match the updated primary sequence number.

7. The method of claim 6, wherein transmitting the updated primary sequence number to the secondary storage device further comprises waiting an amount of time prior to transmitting the updated primary sequence number.

8. The method of claim 6, further comprising waiting for a confirmation from the secondary storage device that the secondary sequence number has been updated.

9. A system to preserve data integrity between primary and secondary storage devices in a mirror and copy environment, the system comprising:
a primary storage device to receive a write command from a host device, the write command having data associated therewith, and execute the write command;
the primary storage device further configured to attach a primary sequence number associated with the primary storage device to the write command, thereby providing a numbered write command with a command sequence number;
the primary storage device further configured to transmit the numbered write command to a secondary storage device;
the secondary storage device configured to compare the command sequence number to a secondary sequence number associated with the secondary storage device;
the secondary storage device further configured to execute the numbered write command in the event the command sequence number matches the secondary sequence number; and
the secondary storage device further configured to ignore the numbered write command in the event the command sequence number does not match the secondary sequence number.

10. The system of claim 9, wherein the secondary storage device is further configured to transmit an error message from the secondary storage device to the primary storage device in the event the command sequence number does not match the secondary sequence number.

11. The system of claim 10, wherein the primary storage device is further configured to invoke an error handling procedure upon receiving the error message.

12. The system of claim 10, wherein transmitting the error message further comprises transmitting the command sequence number and the secondary sequence number.

13. The system of claim 9, wherein the primary storage device is further configured to update the primary sequence number in the event at least one of the following occurs: (a) applications are restarted; (b) services are restarted; (c) resources are transferred between at least two parts of the primary storage device; (d) a hardware failure occurs; (e) a software failure occurs; (d) a path is removed between the primary and secondary storage devices; and (e) a timeout occurs.

14. The system of claim 13, wherein updating the primary sequence number further comprises transmitting the updated primary sequence number to the secondary storage device and updating the secondary sequence number to match the updated primary sequence number.

15. A computer-program product for preserving data integrity between primary and secondary storage devices in a mirror and copy environment, the computer program product comprising a computer-readable storage medium having computer-readable program code embodied therein, the computer-readable program code comprising:
computer-readable program code to receive a write command from a host device, the write command having data associated therewith;
computer-readable program code to write the data to the primary storage device;
computer-readable program code to cause the primary storage device to attach a primary sequence number associated with the primary storage device to the write command, thereby providing a numbered write command with a command sequence number;
computer-readable program code to cause the primary storage device to transmit the numbered write command to a secondary storage device;
computer-readable program code to cause the secondary storage device to compare the command sequence number to a secondary sequence number associated with the secondary storage device;
computer-readable program code to execute the numbered write command on the secondary storage device in the event the command sequence number matches the secondary sequence number; and
computer-readable program code to ignore the numbered write command on the secondary storage device in the event the command sequence number does not match the secondary sequence number.

16. The computer-program product of claim 15, further comprising computer-readable program code to transmit an error message from the secondary storage device to the primary storage device in the event the command sequence number does not match the secondary sequence number.

17. The computer-program product of claim 16, further comprising computer-readable program code to invoke an error handling procedure on the primary storage device upon receiving the error message.

18. The computer-program product of claim 16, further comprising computer-readable program code to transmit the command sequence number and the secondary sequence number to the primary storage device in the event the command sequence number does not match the secondary sequence number.

19. The computer-program product of claim 15, further comprising computer-readable program code to update the primary sequence number in the event at least one of the following occurs: (a) applications are restarted; (b) services are restarted; (c) resources are transferred between at least two parts of the primary storage device; (d) a hardware failure occurs; (e) a software failure occurs; (d) a path is removed between the primary and secondary storage devices; and (e) a timeout occurs.

20. The computer-program product of claim 19, further comprising computer-readable program code to transmit the updated primary sequence number to the secondary storage device and update the secondary sequence number to match the updated primary sequence number.

* * * * *